US009016196B2

(12) United States Patent
Hensel

(10) Patent No.: US 9,016,196 B2
(45) Date of Patent: Apr. 28, 2015

(54) COMPACT JUICER

(75) Inventor: Keith James Hensel, Lane Cove (AU)

(73) Assignee: Breville Pty Limited, Botany, NSW (AU)

( * ) Notice: Subject to any disclaimer, the term of this patent is extended or adjusted under 35 U.S.C. 154(b) by 1733 days.

(21) Appl. No.: 11/912,298

(22) PCT Filed: May 30, 2006

(86) PCT No.: PCT/AU2006/000720
§ 371 (c)(1),
(2), (4) Date: May 27, 2008

(87) PCT Pub. No.: WO2006/128221
PCT Pub. Date: Dec. 7, 2006

(65) Prior Publication Data
US 2008/0314261 A1    Dec. 25, 2008

(30) Foreign Application Priority Data
Jun. 3, 2005    (AU) ................................ 2005902893

(51) Int. Cl.
*B26D 1/00*    (2006.01)
*B02C 15/00*    (2006.01)
*A47J 37/08*    (2006.01)
*A47J 19/02*    (2006.01)

(52) U.S. Cl.
CPC ............ *A47J 37/0835* (2013.01); *A47J 19/027* (2013.01)

(58) Field of Classification Search
CPC ......... A47J 19/027; A47J 19/02; A47J 19/06; A47J 37/0835; A23N 1/00; B25G 1/00
USPC ...................................................... 99/511–513
See application file for complete search history.

(56) References Cited

U.S. PATENT DOCUMENTS

| 2,297,880 | A | * | 10/1942 | Fredrickson | ..................... | 99/512 |
| 2,302,138 | A | * | 11/1942 | Nicholson | ....................... | 99/512 |
| 2,311,379 | A | * | 2/1943 | Gillanders | ....................... | 99/512 |
| 2,481,010 | A | * | 9/1949 | Gundelfinger | ................... | 99/512 |
| 2,845,971 | A | * | 8/1958 | Cordero | .......................... | 99/512 |
| 3,892,365 | A | * | 7/1975 | Verdun | ........................... | 241/92 |
| 4,183,293 | A | * | 1/1980 | Arao et al. | ...................... | 99/512 |
| 4,345,517 | A | * | 8/1982 | Arao et al. | ...................... | 99/511 |
| 4,506,601 | A | * | 3/1985 | Ramirez et al. | ................. | 99/511 |
| 4,614,153 | A | * | 9/1986 | Kurome et al. | ................. | 99/511 |
| 4,681,031 | A | * | 7/1987 | Austad | ............................ | 99/511 |
| 4,700,621 | A | * | 10/1987 | Elger | ............................... | 99/511 |
| 4,840,119 | A | * | 6/1989 | Caldi | .............................. | 99/512 |
| 5,031,522 | A | * | 7/1991 | Brixel et al. | .................... | 99/511 |

(Continued)

FOREIGN PATENT DOCUMENTS

EP    1297767 A1 *    4/2003    ............. A47J 19/02

*Primary Examiner* — Brett Spurlock
(74) *Attorney, Agent, or Firm* — Molins & Co., Pty Ltd

(57) ABSTRACT

A fruit and vegetable juicer has a motor above which is a filter basket that is surrounded by a collection chamber. A feed tube is supported above the filter basket and is integral with a lid to the collection chamber. In preferred embodiments, the separation chamber comprises a central liquid collection portion and a pulp collection portion that surrounds it. In particularly preferred embodiments, the inside diameter of the interior sidewall that separates the pulp collection chamber from the juice collection chamber is tapered toward a central axis of rotation. The smaller diameter end of the sidewall is adjacent to an upper rim of the filter basket.

15 Claims, 4 Drawing Sheets

(56) References Cited

U.S. PATENT DOCUMENTS

| | | | |
|---|---|---|---|
| 5,222,430 A * | 6/1993 | Wang | 99/512 |
| 5,289,763 A * | 3/1994 | Le Rouzic et al. | 99/503 |
| 5,355,784 A * | 10/1994 | Franklin et al. | 99/492 |
| 5,392,699 A * | 2/1995 | Tai | 99/492 |
| 5,405,096 A * | 4/1995 | Seol | 241/282.1 |
| 5,417,152 A * | 5/1995 | Harrison | 99/492 |
| 5,421,248 A * | 6/1995 | Hsu | 99/512 |
| 5,433,144 A * | 7/1995 | Lee | 99/512 |
| 5,435,237 A * | 7/1995 | Huang | 99/492 |
| 5,479,851 A * | 1/1996 | McClean et al. | 99/512 |
| 5,495,795 A * | 3/1996 | Harrison et al. | 99/492 |
| 5,537,918 A * | 7/1996 | Patel et al. | 99/510 |
| 5,662,032 A * | 9/1997 | Baratta | 99/513 |
| 5,669,292 A * | 9/1997 | Chen | 99/512 |
| 5,896,812 A * | 4/1999 | Basora et al. | 99/511 |
| 5,924,357 A * | 7/1999 | Chen | 99/511 |
| 5,979,806 A * | 11/1999 | Borger et al. | 241/37.5 |
| 6,012,385 A * | 1/2000 | Gibson | 99/511 |
| 6,050,180 A * | 4/2000 | Moline | 99/511 |
| 6,135,019 A * | 10/2000 | Chou | 99/513 |
| 6,202,547 B1 * | 3/2001 | Tseng et al. | 99/511 |
| D445,299 S * | 7/2001 | Spagnolo et al. | D7/384 |
| D445,636 S * | 7/2001 | Spagnolo | D7/384 |
| 6,364,226 B1 * | 4/2002 | Kubicko | 241/36 |
| 6,813,997 B1 * | 11/2004 | Lin | 99/511 |
| 6,814,323 B2 * | 11/2004 | Starr et al. | 241/282.2 |
| 6,862,981 B1 * | 3/2005 | Yen | 99/492 |
| 6,862,982 B1 * | 3/2005 | Wang | 99/511 |
| 6,962,107 B1 * | 11/2005 | Yang | 99/492 |
| 6,968,777 B2 * | 11/2005 | Lin | 99/511 |
| 6,971,306 B2 * | 12/2005 | Areh et al. | 99/501 |
| 7,044,051 B2 * | 5/2006 | Le Rouzic | 99/512 |
| D540,127 S * | 4/2007 | Ye et al. | D7/665 |
| 2005/0035231 A1 * | 2/2005 | O'Loughlin | 241/92 |
| 2005/0185509 A1 * | 8/2005 | Carnevale | 366/601 |
| 2005/0235839 A1 * | 10/2005 | Lin | 99/511 |
| 2006/0037488 A1 * | 2/2006 | Schrader et al. | 100/213 |
| 2006/0130676 A1 * | 6/2006 | Cohen et al. | 99/511 |
| 2007/0144358 A1 * | 6/2007 | Huang | 99/348 |
| 2007/0210193 A1 * | 9/2007 | Larsen | 241/92 |
| 2007/0261571 A1 * | 11/2007 | Esteve | 99/504 |
| 2008/0164350 A1 * | 7/2008 | Wu Chang | 241/37.5 |
| 2011/0083566 A1 * | 4/2011 | Backus | 99/511 |

* cited by examiner

COMPACT JUICER

FIELD OF THE INVENTION

The invention pertains to fruit and vegetable juicers and more particularly to a compact juicer with a full size feed tube.

BACKGROUND OF THE INVENTION

Fruit and vegetable juicers are well known. Such devices appear in a variety of sizes depending upon factors such as build quality, juicing capacity and feed tube diameter. Whereas a juicer with a larger footprint may be accepted in some domestic settings and commercial settings, it would be desirable to have a compact juicer primarily for domestic use that had the characteristics of its larger counterparts.

OBJECTS AND SUMMARY OF THE INVENTION

It is an object of the invention to provide a compact fruit and vegetable juicer that utilises a full size feed tube.

It is another objection of the invention to provide a juicer with internal juice flow characteristics that were optimised for facilitating clean up and minimising spillage.

Accordingly, there is provided a fruit and vegetable juicer having a motor above which is a filter basket that is surrounded by a collection chamber. A feed tube is supported above the filter basket and is integral with a lid to the collection chamber. In preferred embodiments, the diameter of the feed tube is substantially the same as the diameter of the grating disk of the filter basket.

In some preferred embodiments, the separation chamber comprises a central liquid collection chamber and a pulp collection chamber that completely surrounds it.

In particularly preferred embodiments, the inside diameter of the tubular interior sidewall that separates the pulp collection chamber from the juice collection chamber is tapered toward the central axis of rotation. The smaller diameter end of the sidewall is adjacent to an upper rim of the filter basket.

BRIEF DESCRIPTION OF THE DRAWINGS

Preferred aspects of the technology will now by described, by way of example only, with reference to the accompany drawings in which.

BEST MODE AND OTHER EMBODIMENTS OF THE INVENTION

Figure 1:
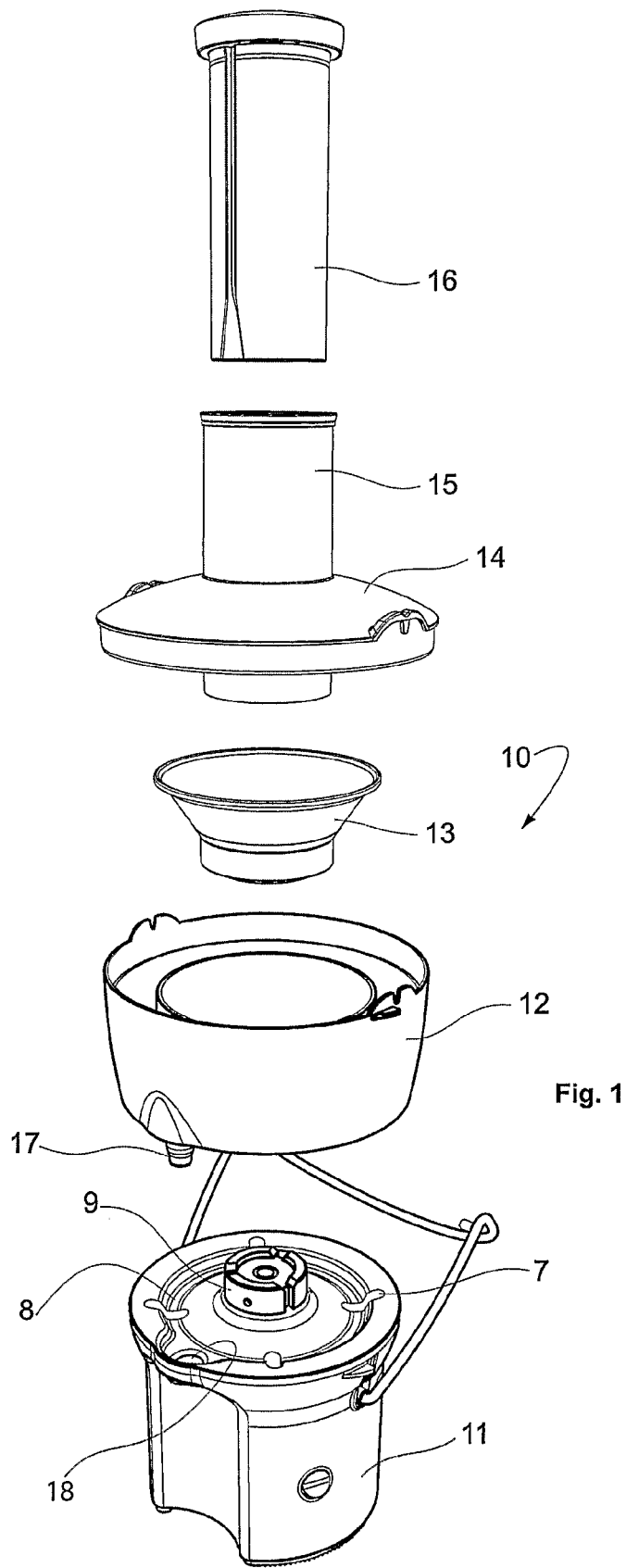
FIG. 1 is an inline for assembly view of an embodiment juicer appliance or apparatus.

As shown in FIG. 1, a compact fruit and vegetable juicer 10 comprises a motorised base 11 above which is received a collection chamber 12. The base has an upper surface that includes a central mote 8 that is adapted to receive cooperating features formed into the bottom of the collection chamber 12. Elastomeric pads 7 dampen vibration between the base 11 and the chamber 12. The mote 8 leads to, flows into and includes an opening 18 through which extends the chamber's spout 17.

A removable filter basket and grater 13 resides within the collection chamber and is accessible to the base's drive spindle 9 through an opening in the floor of the collection chamber 12. The collection chamber 12 is covered by a lid 14 that includes a full size feed tube 15 being about 65 mm-85 mm and preferably 75 mm in internal diameter. A pusher 16 co-operates with the feed tube 15 to urge the contents of the feed tube toward the grating disk of the filter basket 13. As will be explained, the generally toroidal collection chamber 12 is sub-divided into two nested and preferably concentric portions. One radially outer portion serves the purpose of collecting pulp discharged by the filter basket 13. The other radially inner portion collects extracted juice and discharges if through the spout 17. By locating the pulp and juice collection chamber 12 and spout 17 essentially above the base 11, the "footprint" of the juicer 10 (for a given motor size) is optimized. A single essentially cylindrical wall is shared by the pulp and juice collection chambers and separates these two portions.

Figure 2:
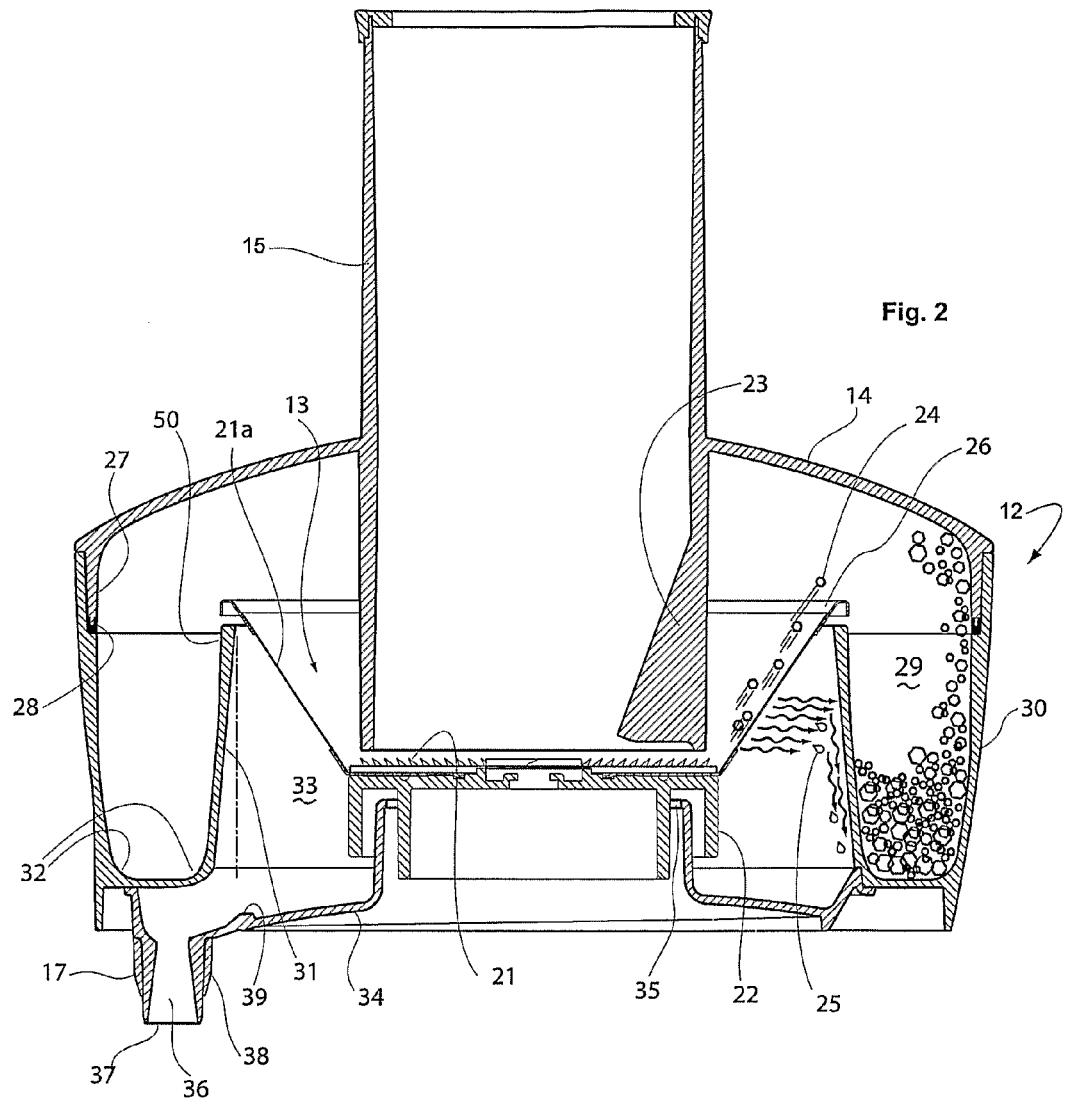
FIG. 2 is a partial sectional view of the embodiment juicer appliance of FIG. 1, showing a collection chamber having an inner juice collection portion and an outer pulp collection portion.

As shown in FIG. 2, the filter basket 13 further comprises a frusto-conical sieve 21a that is joined to a grating disk 21. Both the sieve 21a and the disk 21 are joined to a coupling 22 that is driven by the output spindle 9 of the base 11. When the lid 14 is closed, the feed tube 15 is located above and in registry with or preferably but not necessarily concentric with the grating disk 21. The feed tube 15 is also characterised by an internal anti-rotation knife 23. Note that the internal diameter of the feed tube 15 is approximately the same as (or marginally smaller than) the maximum effective or useful diameter of the grating disk 21.

As shown on the right hand side of FIG. 2, food matter urged toward the grating disk 21 by the pusher 16 is reduced to pulp 24 and juice 25. Droplets of juice 25 are able to pass through the expanded metal mesh that forms the sieve of the filter basket 13. Pulp particles are unable to pass through the sieve and are therefore ejected above the rim 26 of the filter basket 13. It is inevitable that a certain amount of juice is carried by the ejected pulp. Because it is possible for positive air pressure to develop inside of the collection chamber, the seal between the lid 14 and the base of the collection chamber 12 may be improved by providing an elastomeric bead or tip 28 in the area of the lid's seal with chamber's outer wall 30. In this example, the lid's descending rim 27 is provided with a circumferential elastomeric tip 28 that inhibits the migration of juice from the seam between the removable lid 14 and the collection chamber 12.

As illustrated in FIG. 2, the collected pulp particles 24 will accumulate in the toroidal zone 29 that is defined by the generally cylindrical outer wall 30 of the collection chamber 12 and the chamber's generally cylindrical inner wall 31. Note that for ease of cleaning, the inner and outer corners 32 at the bottom of the pulp collection area 29 are rounded.

The internal juice collection portion 33 of the collection chamber 12 is defined by the underside of the sieve 13, the interior of the inner wall 31 and (in this example) a separately moulded floor 34. The floor 34 is preferably sealed to the underside of the chamber, for example, by ultrasonic welding. As shown in FIG. 2, the floor is joined to and edge-sealed against the underside of the main body of the collection chamber 12. The floor includes a central opening 35 so that the coupling 22 can engage the spindle 9 (not shown). In this example, the discharge spout 36 is located radially outward at a point that corresponds approximately to mid-way between the inner and outer walls 30, 31 of the pulp collection chamber 12. The discharge nozzle 36 is tapered so that the diameter of the opening increases progressively toward the terminal discharge opening 37. Note that because the nozzle passes through an opening 18 in the base (see FIG. 1), a soft polymer sleeve 38 encircles the nozzle 36 to minimise noise associate with normal vibration that occurs during use. The separately moulded floor 34 allows the outer wall 31 or separating wall 31 to be moulded with a draft or taper that would otherwise not be practical to manufacture.

The spout is aligned essentially vertically so as to discharge downwardly. The discharge nozzle 36 is also optionally associated with a small internal dam 39. The dam rising above the floor 34 inhibits the movements of smaller quantities of extracted juice towards the nozzle. This feature thus prevents prolonged dripping. The tapered nozzle shape encourages a swirling motion of the juice flowing through the nozzle and thus minimises spattering and splashing during discharge.

As shown on the left hand side of FIG. 2, the inside wall (separating wall) 31 of the juice collection chamber is tapered or inclined with respect to the vertical. As shown, the upper rim 40 of the inside wall 31 is closer to the centre of the juicer than the lower edge or base of the wall. It has been observed that inclining the separating wall 31 so that it narrows in diameter at the top helps improve the flow of juice toward the floor 34. The taper assists the juice within the juice collection portion 33 to flow toward the floor and therefore toward the nozzle rather than toward the gap between the upper rim 40 of the inner wall 31 and the rim 26 of the filter basket. As previously mentioned, the provision of a separately moulded floor and mechanically bonded (sealed) floor is necessitated primarily by manufacturing constraints associated with the negative draft angle created along the interior surface of the inside wall 31.

Note that the upper rim or extremity 50 of the inside wall 31 is strengthened by it being slightly thicker than the remaining section of the inner wall. The upper extremity 50 is also in registry with the upper or outer rim 26 of the filter basket.

Figure 3:
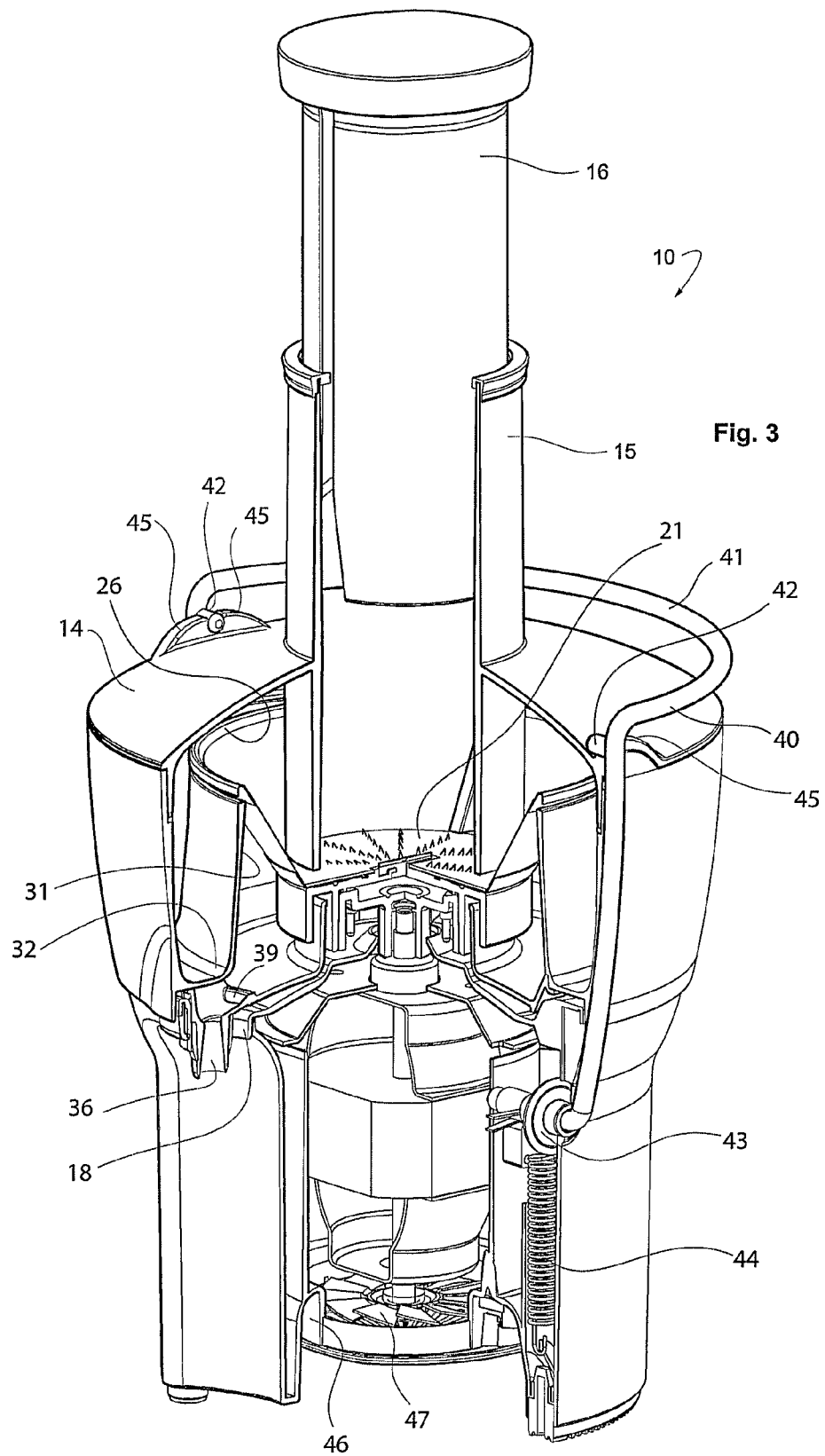
FIG. 3 is a partial cutaway perspective view of the embodiment juicer appliance of FIG. 1.

As shown in FIG. 3, the lid 14 is secured, during operation, by a safety bar 40. The safety bar comprises a generally semi-circular upper portion 41 that carries a pair of inward facing and opposed pins 42. The lower ends of the safety bar 40 are carried by polymeric bushings 43. The entire bar 40 has a limited range of vertical motion but is urged into a downward position by a pair of internal tension springs 44. Note that the lid 14 is generally symmetrical and can thus be mounted in two orientations with respect to the safety bar 40. Thus, when the lid is closed, the pins 42 can ride up either of the symmetrically opposed ramps 45 (depending on which way the lid is oriented), eventually coming to rest in a detent that is located between the ramps. An internal portion of the safety bar 40 is mechanically interconnected with a cut-out switch so that the motor can only be operated when the safety bar 40 is fully upright, that is, in the orientation depicted in FIG. 3. FIG. 3 also illustrates that the underside of the juicer 10 comprises an electrical cord storage space 46 that surrounds the inlet duct 47 associated with the motor's cooling fan.

Figure 4:
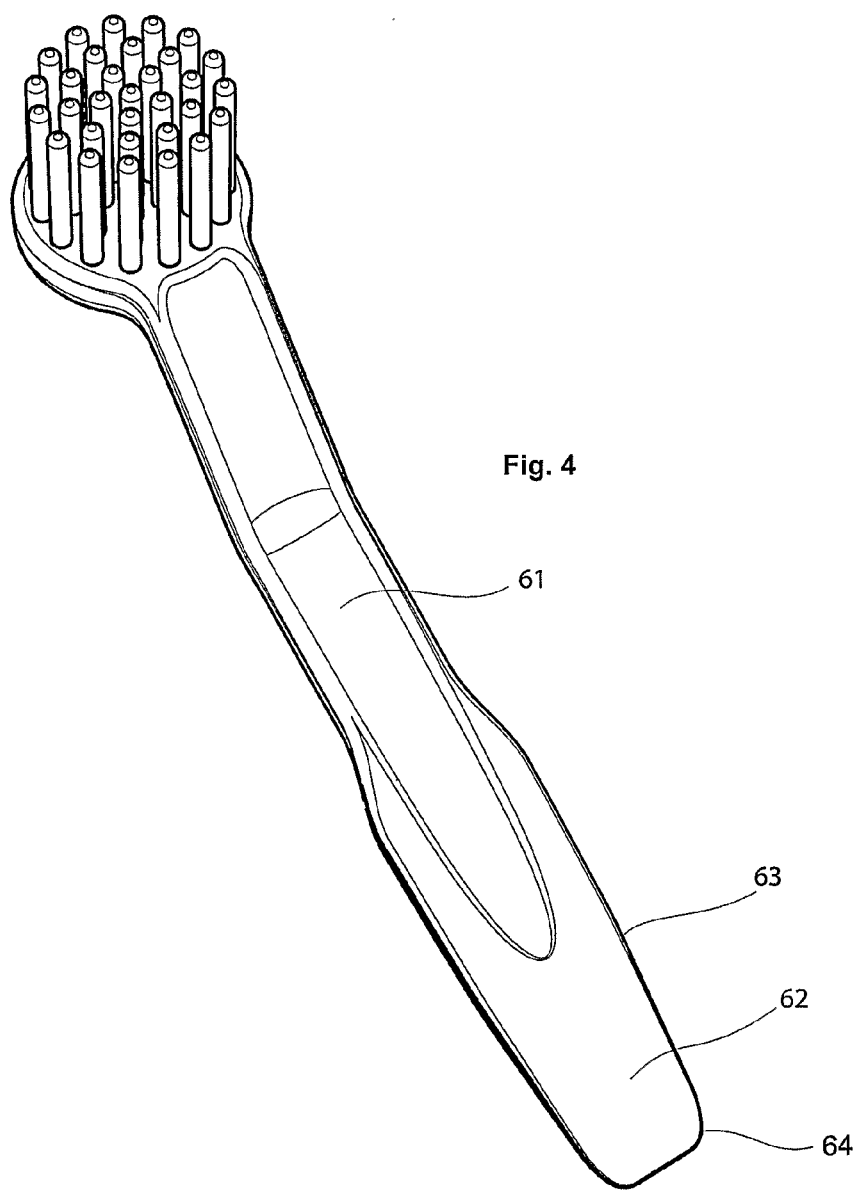
FIG. 4 is a perspective view of an embodiment cleaning tool for a juicer appliance.

As shown in FIG. 4, a specially configured brush may be provided with or as a separate component to the juicer 10. The brush 60 has a round head attached to an integral handle 61 that is angled, matching the cone angle of the sieve, so as to facilitate cleaning of the grating disc. The end of the handle 62 is blade-like and has tapering wings or sides 63 that flare out from the shank of the handle and conform closely to the cross sectional shape of the pulp compartment 29. Note that the bottom corners 64 are shaped to fill and conform to the rounded corners 32 at the bottom of the pulp compartment 29. The end 62 is adapted to scrape the interior walls of the pulp compartment without scratching it.

While the present invention has been disclosed with reference to particular details of construction, these should be understood as having been provided by way of example and not as limitations to the scope of spirit or the invention.

What is claimed is:

1. A juicer comprising:
a motorised base having an upper surface from which protrudes a drive spindle, the upper surface adapted to receive a collection chamber;
the collection chamber having a spout; the collection chamber further having a lid with a feed tube; the collection chamber being removably located on the base and having a central opening for admitting the drive spindle;
a frusto-conical filter basket residing within the collection chamber, below the feed tube;
the collection chamber having an outer wall and a base; an internal dividing wall defines two nested portions within the collection chamber, being an outer pulp collection portion and an inner juice collection portion; the spout is in fluid communication with the inner juice collection portion; the outer pulp collection portion is in the form of a substantially annular trough between the outer wall and internal wall that is located around the inner juice collection portion;
wherein the internal wall is common to the two nested portions and encircles the inner juice collection portion; and an inner surface of the internal wall is tapered or inclined with respect to the vertical, such that the internal wall is closer to the axis of rotation of the filter basket at an upper extremity of the internal wall than at the base of the internal wall.

2. The juicer of claim 1, wherein:
the upper extremity of the internal wall is thicker than a remainder of the internal wall.

3. The juicer of claim 1, wherein:
a rim of the filter basket is in registry with the upper extremity of the internal wall.

4. A juicer of claim 1, wherein:
the collection chamber has a floor that is separately molded and affixed about the underside of the collection chamber.

5. The juicer of claim 1, wherein:
the nested portions are separated by the single shared internal wall.

6. The juicer of claim 1, wherein:
the chamber has a lid, the lid having a descending rim provided with a circumferential sealing tip that is elastomeric.

7. The juicer of claim 1, wherein:
the feed tube is about the same diameter as a grafting disk that is located below it within the chamber.

8. A juicer comprising:
a motorised base having an upper surface from which protrudes a drive spindle, the upper surface adapted to receive a collection chamber;
the collection chamber having a spout; the collection chamber further having a lid with a feed tube; the collection chamber being removably located on the base and having a central opening for admitting the drive spindle;
a frusto-conical filter basket residing within the collection chamber, below the feed tube;
the collection chamber having an outer wall and a base; an internal dividing wall defines two nested portions within the collection chamber, being an outer pulp collection portion and an inner juice collection portion; the spout is in fluid communication with the inner juice collection portion; the outer pulp collection portion is in the form of a substantially annular trough between the outer wall and internal wall that is located around the inner juice collection portion;

wherein the two nested portions are separated by the single shared internal wall, and an inner surface of the internal wall is tapered or inclined with respect to the vertical, such that the internal wall is closer to the axis of rotation of the filter basket at an upper extremity of the internal wall than at the base of the internal wall; and wherein the inner collection portion having a separately molded floor that is affixed about the underside of the collection chamber.

9. The juicer of claim 8, wherein:
the floor has formed in it a vertical discharge spout.

10. The juicer of claim 8, wherein:
the discharge spout is adapted to pass through an opening formed in an upper surface of the base.

11. The juicer of claim 8, wherein:
the discharge spout is tapered, the internal diameter increasing toward a terminal discharge opening.

12. The juicer of claim 8, wherein:
the discharge spout is located radially within an outer wall of the chamber.

13. The juicer of claim 8, wherein:
the lid has a descending rim provided with a circumferential sealing tip that is elastomeric.

14. The juicer of claim 8, wherein:
the feed tube is about the same diameter as a grating disk that is located below it within the chamber.

15. The juicer of claim 8, wherein the inner surface of the internal wall is continuously tapered with respect to the vertical.

\* \* \* \* \*